Dec. 15, 1959   C. E. QUISENBERRY   2,917,122
ELECTRICALLY POWERED JUVENILE VEHICLE
Filed Aug. 12, 1957   2 Sheets-Sheet 1
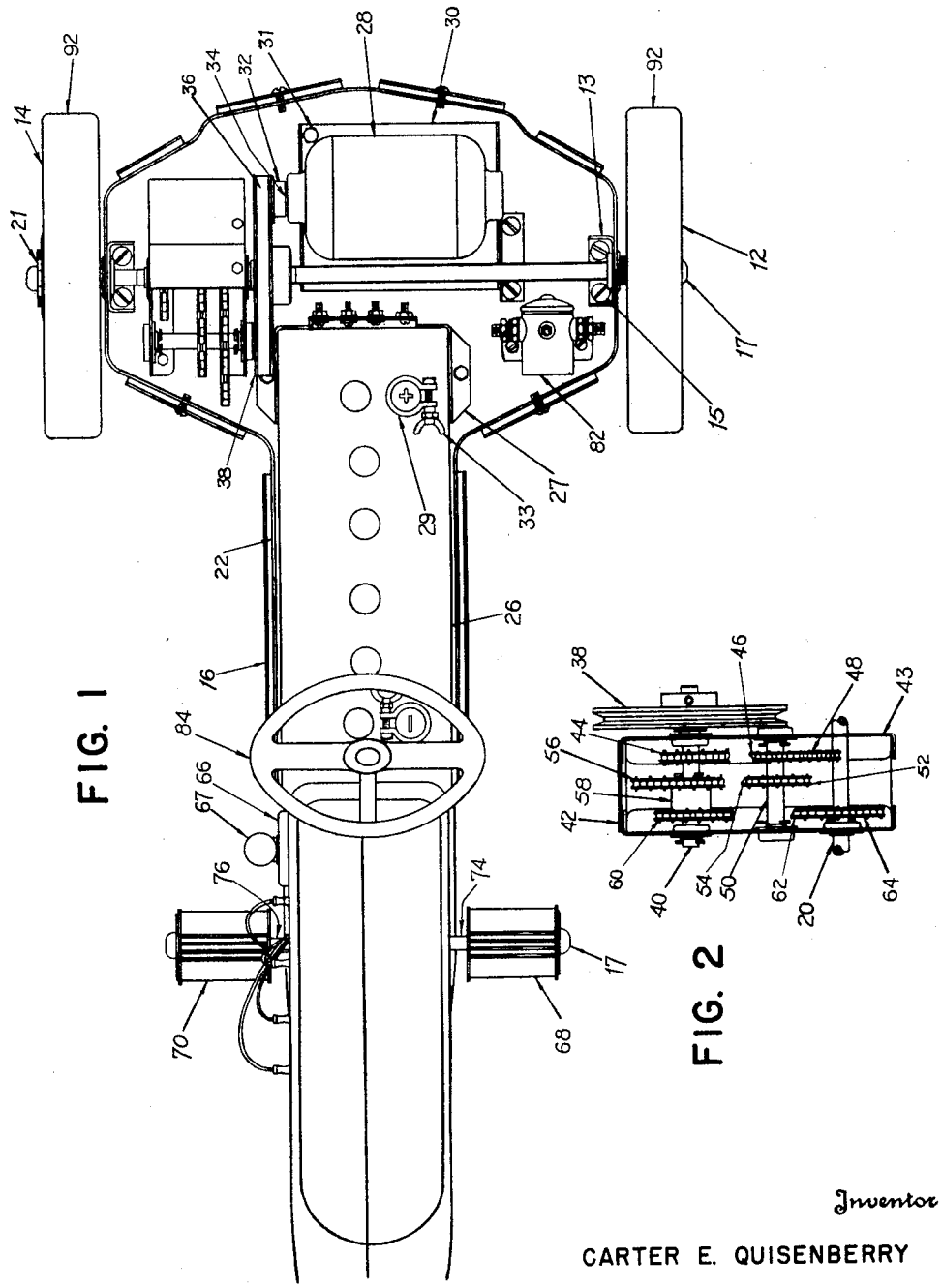
Inventor
CARTER E. QUISENBERRY

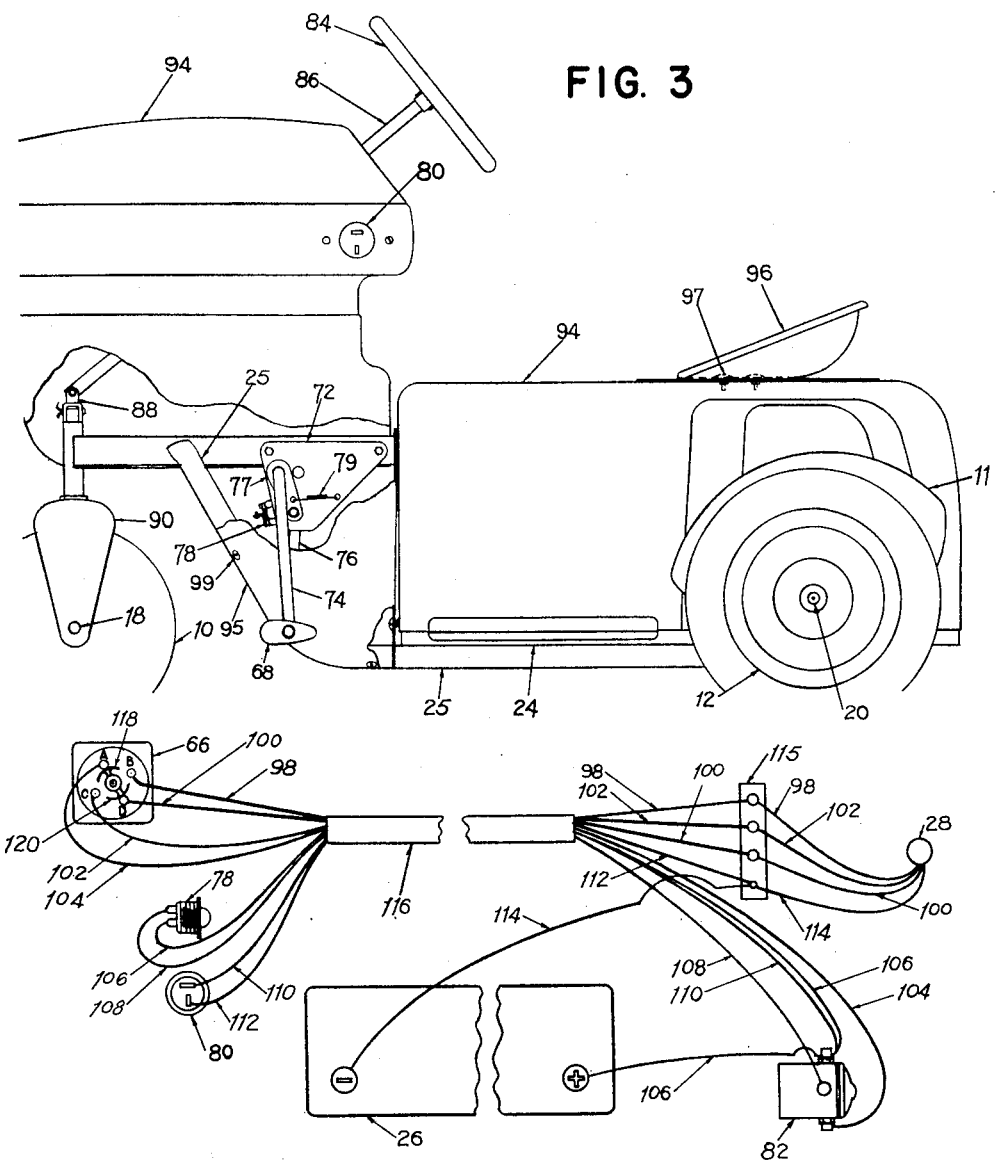

United States Patent Office 2,917,122
Patented Dec. 15, 1959

2,917,122
ELECTRICALLY POWERED JUVENILE VEHICLE

Carter E. Quisenberry, Kirkwood, N.Y., assignor to American Machine and Foundry Company, a corporation of New York Application August 12, 1957, Serial No. 677,555

8 Claims. (Cl. 180—25)

This invention relates to children's wheeled goods, and particularly to a juvenile, electrically powered, farm tractor.

An object of this invention is to provide a realistic appearing, junior size model of a farm tractor, having a rugged construction, ease of operation by a juvenile, having a forward and reverse motion controlled electrically.

Another object is to provide a safety mechanism for use on an electrically powered children's vehicle wherein two individually operable pedals are to be simultaneously depressed, and a control switch placed in closed circuit position before the vehicle may be propelled.

Still another object is to provide a juvenile, electrically powered tractor having an underslung chassis and low center of gravity rendering it stable and preventing overturning during its operation.

With these and other objects not specifically mentioned in view, the invention consists in the construction and combinations which will be hereinafter fully described and then set forth in the claims hereunto appended.

In the accompanying drawings which form a part of this specification and in which like characters of reference indicate the same or like parts:

Fig. 1 is a partial plan view of the electrically powered tractor.

Fig. 2 is a plan view of a sprocketed transmission showing the power input pulley and the power output or rear axle.

Fig. 3 is a partial side elevation of the tractor.

Fig. 4 is the schematic wiring diagram showing the circuits used in the operation of the tractors.

Fig. 4a is a view showing the details of switch 78.

Referring to the drawings, I have shown a tractor having three wheels, one forward 10 and two rearward 12 and 14. A chassis 16 is mounted in suspension between said wheels and is attached to the wheels by front 18 and rear axles 20 supported in bearing housing 13 held by screws 15. Wheel caps 17 are placed over the ends of the rear axle 20. The rear wheels 12 and 14 may be covered by suitable fenders 11.

The chassis 16 is so constructed that a battery case or compartment 22 is located at a centrally located point between the three wheels. A major problem in designing a small vehicle is the arrangement of the bulky or heavy components. I have solved this problem to advantage by positioning an electric storage battery on a base supported by the main frame assembly 25 located below the level of the axles 18 and 20. The weight of the battery and its positioning at a point substantially equidistant from the wheels, renders the center of gravity of the vehicle comparatively low, and free from tipping.

When the weight of an electric storage battery 26 or other source of electrical power is positioned on this underslung floor portion 24 of the main frame 25, a greater stability results.

A battery 26 secured by suitable battery holders 27 and having suitable battery clamps 29 with fastening nuts 33 may be used as the source of power. While any suitable elongated battery may be used, I have found that a 12 volt battery provides efficient operation.

I have shown as driving means a direct current series wound electric motor 28 of the correct voltage mounted on a base 30 secured to the chassis 16 at a point adjacent to the rear axle 20, and driven by the battery 26.

A pulley is keyed to the motor shaft 34. A belt 36, driven by pulley 32, describes a closed path of travel over pulley 32 and pulley 38 which is keyed to the input shaft 40 of a sprocket and chain transmission, designated generally at 42.

Transmission 42 contained within a housing 43 comprises the driven input shaft 40 which mounts a sprocket 44 keyed thereto. Roller chain 46 is driven by sprocket 44, and in turn drives sprocket 48, which is mounted on and keyed to intermediate shaft 50, rotating it. Sprocket 52 is mounted on and keyed to the intermediate shaft 50 at a spaced distance from sprocket 48.

Roller chain 54 is driven by sprocket 52, and in turn drives sprocket 56 which is mounted on sleeve 58. Sprocket 56 and sleeve 58 freely rotate on input shaft 40.

Sprocket 60 is joined to the opposite end of sleeve 58 and rotates on the power input shaft 40 with sleeve 58 and sprocket 56. Roller chain 62 is driven by sprocket 60, and in turn drives sprocket 64 which is mounted on and keyed to the rear axle 20.

I have shown one driven wheel 14, the right rear wheel 14 which is keyed to the rear axle 20 by suitable means such as the drive and groove pin 21. The opposite rear wheel 12 rolls free over bearings on that shaft 20. A universal at the rear axle 20 is thus rendered unnecessary.

An armature control switch 66 is mounted on the upper right side of the chassis 16, at a point within a child's arm's length from a driver's seated position. This switch 66 has a control knob 67, resembling in appearance a gear shift knob. The knob when urged toward a forward contact point, as shown in Fig. 4, will cause the directional movement to be forward; when upright in the center, there will be no movement; when urged backward, the direction of movement will be in reverse.

The forward or rearward movement of the tractor may be accomplished by any suitable control. A direct current series wound motor 28, as shown herein is so wired that changing the direction of the motor shaft 34, and thus the propelling wheel driven by it, is accomplished by electrically reversing the armature, eliminating the need for a gear shift. Fig. 4 shows the switch 66 in standing still or neutral position, with switching knob 67 upright. As knob 67 is urged forward, contacts A and C are joined, and B and D are joined, causing the motor 28 to rotate in a manner propelling the vehicle in forward direction. As knob 67 is pulled backward, contacts A and B are joined, and C and D are joined, causing the motor 28 to rotate in an opposite direction, propelling the vehicle in a reverse direction.

In the manufacture of a juvenile device of the type shown herein, it is essential that a prime consideration be that of safety for the operator as well as for other children. I have therefore provided dual safety control pedals 68 and 70 mounted at the lower forward portion of the chassis 16.

Vertical brackets 72 are mounted on both sides of the forward portion of the chassis 16. Individually operable pedal arms 74 and 76 are pivotally mounted through holes provided therefor in each of said brackets 72, and pedals 68 and 70 are attached to the lower portion of the pedal arms 74 and 76.

A vertically, downwardly positioned crank arm 77 is fixed to the upper horizontal portion of each pedal arm 74 and 76, adjacent to the point at which the pedal arms 74 and 76 are supported by the chassis 16.

In operation, as the pedals 68 and 70 are urged forward, each crank arm 77 causes the closing of a single contact 68a and 70a in a double contact switch 78 as shown in Fig. 4a.

Tension springs 79 urge the respective pedals out of contact with the safety switch 78. The switch 78 serves to open or close a portion of the circuit.

The vehicle is so wired that in order for it to be driven, both left pedal 68 and right 70 must simultaneously be fully depressed before that portion of the circuit is closed, and before the tractor will respond to the movement selected by the control switch 66. By this arrangement it would be impossible for the operator to inadvertently cause the vehicle to move if one foot should depress one pedal. Only the positive, considered action of the driver, in depressing both pedals and in selecting the direction, would cause the vehicle to respond.

By the same token, while being propelled, by easing a foot from either pedal, a contact point is opened and the tractor may safely be brought to a halt.

A power input plug 80 connected to the battery 26, is mounted on the upper portion of the chassis 16. Any commercially sold battery charger may thus be connected to this plug 80, allowing re-charging of the battery 26 without the necessity of removing it from the vehicle.

In order to prevent unnecessary arcing caused by stopping or starting with the switch 66 partially opened, a solenoid 82 is provided to energize the controls to render them positively operative or inoperative.

Steering is accomplished by the use of a steering wheel 84 keyed to the upper end of a shaft 86. A steering knuckle 88 is connected to its lower end, and the upper end portion of a yoke or front wheel fork 90 is connected to the steering knuckle 88. The front wheel 10 is shafted through the lower portion of the fork 90.

The sprocket and chain type transmission 42 as used herein avoids the necessity for precision cut gears, and is inexpensive but efficient.

The transmission 42 is positioned at one end of the rear axle 20, which in turn is mounted for rotation through the transmission housing 42. An intermediate drive shaft is thus unnecessary.

To provide greater traction and a more realistic appearance, traction type tires 92 have been mounted on the rear wheel rims 12 and 14. A suitable tractor type body 94 and three position seat 96 is mounted over the chassis 16 adding to the authenticity demanded by the younger generation. Suitable covering plates 95 secured by self tapping screws 99 cover the main frame assembly 25.

The invention thus disclosed shows a rugged three-wheel, realistic, electric-powered tractor developed to perform safely when operated by children.

Due to the positioning and combination of the parts, affording a low center of gravity and the placement of the weight necessary for required traction at a point slightly forward of the rear axle 20, the stability of the vehicle and handling ease become immediately apparent.

The coacting safety control pedals 68 and 70 required to act in concert with the movement control switch 66 provide the maximum safety in operation.

Fig. 4 shows diagrammatically the various connections made with respect to the electrical wiring employed to control and drive the battery powered vehicle illustrated in Fig. 1.

Electrical current is supplied by an elongated 12 volt automobile type storage battery 26. The negative terminal of the battery is connected by a wire 114 to a grounded connection on the terminal strip 115. The positive terminal of the battery 26 is connected by wire 106 to one of the contact terminals of a relay 82. The contact to which the wire 106 is connected also is connected with one of the terminals of the normally open, double contact pedal switch 78. The other contact of the normally open double contact switch 78 is connected by wire 108 to one side of the actuating coil of relay 82. The other side of the relay actuating coil is grounded, to the chassis of the vehicle.

The other contact connection of the relay 82 is connected by wire 104 to the contact A on rotary switch 66. The contact D of switch 66 is connected by wire 100 through terminal strip 115 to one of the field connections of motor 28. The other field connection of the motor 28 is connected by wire 114 through terminal strip 115 to the ground terminal of the battery 26. The ground side of the charging receptacle is also connected by wires 112 and 114 through the terminal strip 115 to the negative terminal of the battery 26.

The contact B of hand operated switch 66 is connected by wire 98 through terminal strip 115 to one of the armature brushes of the motor 28. The contact C of the manually operated switch 66 is connected through wire 102 through terminal strip 115 to the other armature brush of the motor 28. The positive charging contact of receptacle 80 is connected by wire 110 through the contact on relay 82 through wire 106 to the positive terminal of the battery.

From the foregoing description it will be evident that by connecting a polarized charging plug to the receptacle 80 the battery 26 may be readily charged whenever necessary.

The switch 66 is of the rotary type having two separate arcuate shaped contact elements, 118 and 120. The contact elements 118 and 120 are manually controlled and move in unison so that they may be placed in either neutral, forward or reverse positions. In neutral position the contacts 118 and 120 are only engaged with contacts A and D respectively. When the manually operated switch 66 has the terminal contacts 118 and 120 turned to forward position the contact element 118 will connect contacts A and C, while contact element 120 will connect contacts D and B.

When the contact elements 118 and 120 of manually operated switch 66 is moved into reverse position the contact element 118 will connect contacts A and B while the contact element 120 will connect contacts C and D.

It will be appreciated that when the contact switch 66 is placed in neutral position no current will flow through this switch. When the manually operated switch 66 has had the contact elements moved into either forward or reverse position no current will flow through the switch 66 unless the relay 82 has been actuated due to the closure of both pedal controlled contacts of switch 78.

From the foregoing description it will be readily apparent that the storage battery 26 can be easily charged merely by inserting a polarized plug into the receptacle 80. It will also be apparent that the relay 82 can only be actuated when both pedals 68 and 70 have been depressed thereby closing both contacts of the double contact switch 78 thereby enabling current to flow through the actuating coil of the relay 82. When the relay 82 has been actuated in this manner current will flow through the closed contacts of relay 82, through wire 104 to the contact A which will then be energized. For the vehicle to be moved either forwardly or in reverse the switch 66 will have to be actuated to move the arcuate contacts 118 and 120 into either forward or reverse position. If the contacts 118 and 120 have been moved into forward position current will flow from contact A to contact C through wire 102 through the motor armature out through wire 98 into contact B through segment 120 to contact D through wire 100 through the motor field and then through the wire 114, and then back to the negative terminal of the battery.

When the manually operated switch has been moved into reverse position electric current will flow from contact A through contact B through wire 98 through the armature of the motor, out through wire 102 to contact C, then through segment 120 into contact D through wire 100, through the field of the motor out through wire 114 back to the negative terminal of the battery. For convenience all the wires may be enclosed in a suitable harness 116.

From the foregoing description it will be evident that I have provided a safety control which will only permit the tractor to be driven when the child has his feet on both operating pedals.

The invention herein described may be varied in construction within the scope of the claims, for the particular device selected to illustrate the invention is but one of many embodiments of the same. The invention therefore is not to be restricted to the details illustrated and described.

What I claim is:

1. An electrically powered juvenile farm tractor comprising in combination, a plurality of wheels front and rear, front and rear axles mounting said wheels, an underslung chassis mounted on said axles, an electric storage battery, a direct current series wound, reversible motor operable by said battery, battery and motor supporting portions of said chassis being below the center of said axles, a transmission for transmitting torque from said motor to one only of said wheels, means for controlling the lateral motion of said tractor, means for controlling the forward and rearward motion of said tractor, said means includes two independently operable pedals, a double contact switch, each pedal operating its own single contact of said double contact switch, and an armature reversing switch connected in series with said double contact switch and said battery.

2. A juvenile electrically powered farm tractor comprising in combination three wheels, means rotatably mounting said wheels one forward and two rearward thereof, an underslung chassis having a battery case mounted thereon supported on said means, a power source supported on said chassis, a motor connected to and driven by said power source, means for transmitting torque from said motor to one of said wheels, means for controlling the lateral direction of said tractor, means for de-energizing said motor, a reversing switch for selectively changing the direction of current flow within said motor controlling forward and rearward motion of said tractor, a series connected switch connected to said reversing switch and pedals coacting to activate said series connected switch that in turn activates said reversing switch when said reversing switch is in closed circuit position.

3. A juvenile electrically powered farm tractor comprising in combination a plurality of wheels arranged with a steering portion and a driving portion, an underslung chassis having a battery case mounted thereon, a pair of axles for mounting said wheels to said chassis, a power source supported on said chassis, a motor supported on said chassis, means for transmitting torque from said motor to one only of said wheels, means for controlling the lateral direction of said tractor, means for energizing said motor from said power source, means for selectively controlling forward and rearward motion of said tractor, an electro-mechanical series connected switch and dual pedals coacting to activate said electro-mechanical series connected switch that in turn activates said last named means.

4. In a juvenile farm tractor, the combination comprising an underslung chassis having a battery mounted thereon, a plurality of wheels arranged with a forward steering portion and a rearward driving portion, axles mounting said chassis in suspension between said wheels, a power source mounted on said chassis, a direct current series wound motor connected to and driven by said power source, means for transmitting torque from said motor to a point remote therefrom, means at said point for transferring said torque to one only of said wheels, said transferring means including a speed reduction transmission, means for controlling lateral direction of said tractor, a switch for selectively controlling forward and rearward direction of said tractor, an electro-mechanical series connected switch and dual pedals coacting to activate said series connected switch that in turn activates said direct current series wound motor.

5. A juvenile electrically powered farm tractor comprising in combination a plurality of wheels, an underslung chassis having a battery case mounted thereon, axles joining said wheels to said chassis, a battery mounted in said battery case, a motor connected to and driven by said battery, a sprocket and chain speed reduction transmission, means for transmitting torque from said motor to said transmission, a sprocket chain for transmitting torque to one only of said wheels, means for steering said tractor, a switch for selectively activating said motor and a double contact switch connected in series with said first switch, and dual pedals coacting to activate said double contact switch that in turn activates said motor.

6. A juvenile electrically powered farm tractor comprising in combination a plurality of traction tired wheels, an underslung chassis, axles joining said wheels to said chassis, a battery mounted on said chassis, a motor connected to and driven by said battery, a sprocket and chain transmission, means for transmitting torque from said motor to said transmission, means for transmitting torque to one only of said wheels, means for steering said tractor, a reversing switch for selectively activating said motor, a second switch having double contacts, and dual pedals coacting to activate the double contacts of said second switch which in turn activates said reversing switch when said reversing switch is in closed circuit position.

7. In a juvenile farm tractor, the combination comprising an underslung chassis having a battery case mounted thereon, three wheels one forward and two rearward, axles mounting said chassis in suspension between said three wheels, an electric storage battery supported within said battery case on a portion of said chassis, said portion being substantially below the level of said axles, a direct current motor connected to and driven by said power source, means for transmitting torque from said motor to one only of said wheels, a steering device for controlling lateral direction of said tractor, a reversing switch for changing the direction of current flow within said motor controlling forward and rearward motion of said tractor, a second switch in series with said first switch, and dual pedals independently operable to operate in concert to activate said second switch that in turn activates said reversing switch when said reversing switch is in closed circuit position.

8. In a juvenile farm tractor, the combination comprising three wheels one forward and two rearward, an underslung chassis, means for mounting said chassis on said wheels in suspension between said wheels, a source of electric potential mounted on said chassis, electrically operated driving means connected to and driven by said source of electric potential, means for transmitting torque from said driving means to one only of said wheels, a steering device for steering said front wheel, a reversing switch for selectively changing the direction of current flow within said electrically operated driving means controlling forward and rearward motion, a double contact switch having said contacts in series with each other and with the reversing switch, two pedals, one on each side of said tractor, coacting with said double contact switch, to activate the contacts of said double contact switch, and a solenoid connecting energizing means to the electrically operated driving means.

References Cited in the file of this patent

UNITED STATES PATENTS

| | | |
|---|---|---|
| 958,816 | Merkley | May 24, 1910 |
| 1,492,701 | Cochran | May 6, 1924 |
| 1,830,310 | Apple | Nov. 3, 1931 |
| 2,207,447 | Viles et al. | July 9, 1940 |
| 2,224,411 | Smith | Dec. 10, 1940 |
| 2,250,754 | Dooley | July 29, 1941 |
| 2,570,319 | Cassady | Oct. 9, 1951 |
| 2,586,273 | Steven | Feb. 19, 1952 |
| 2,797,105 | Douglas et al. | June 25, 1957 |